March 28, 1944. J. S. CURTIS 2,345,383
MOWING MACHINE
Filed Dec. 31, 1941
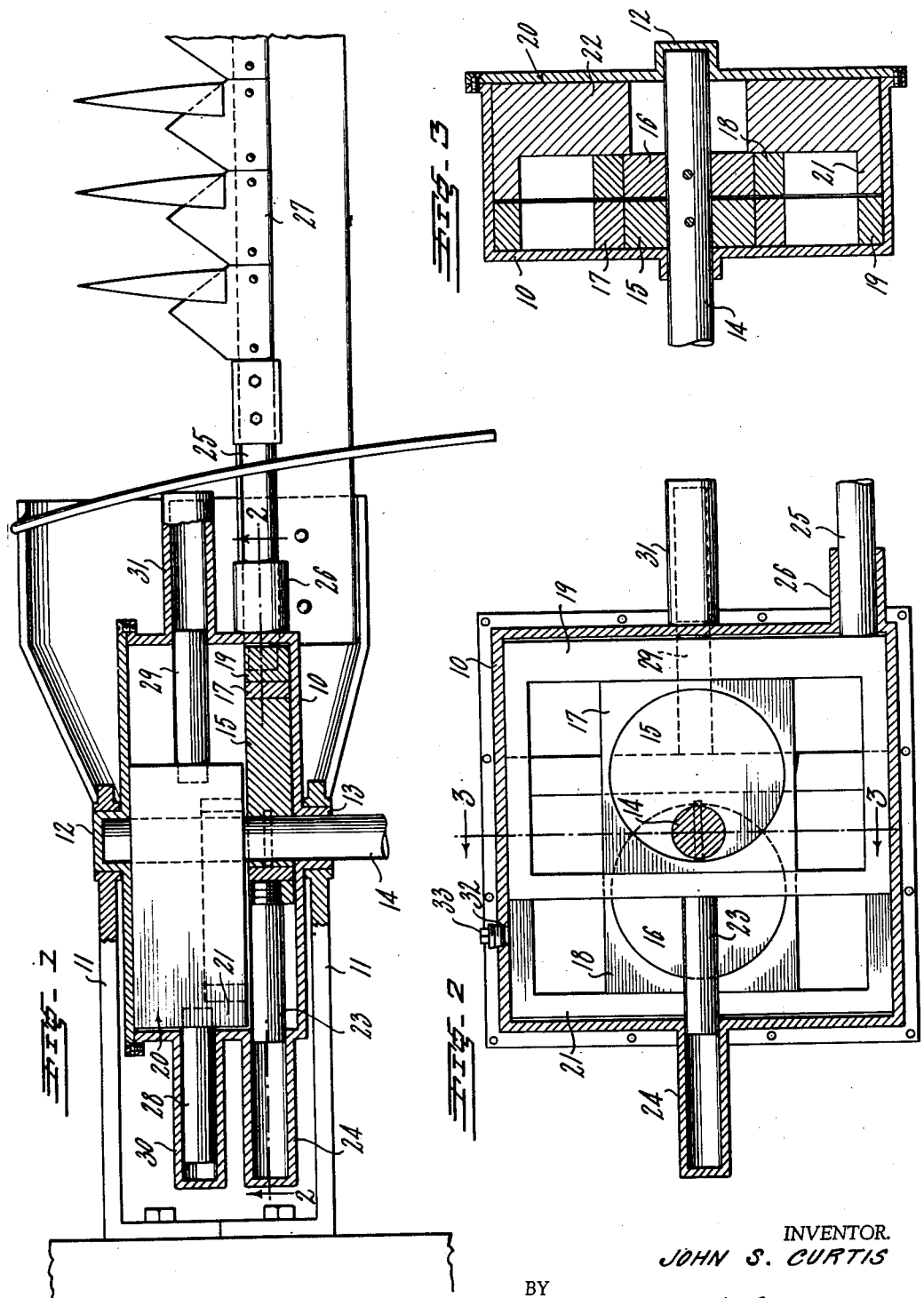
INVENTOR.
JOHN S. CURTIS
BY Lawrence W. Lindberg
ATTORNEY Patented Mar. 28, 1944

2,345,383

UNITED STATES PATENT OFFICE 2,345,383

MOWING MACHINE

John S. Curtis, Tulare, Calif.

Application December 31, 1941, Serial No. 425,069

3 Claims. (Cl. 74—50)

This invention relates to a mechanical device for converting rotary motion into reciprocatory motion, and more particularly to a device for converting the rotary motion of a drive shaft into the reciprocatory motion of the cutting knife of a mower.

The drive for the knife of a conventional mowing machine usually consists of a pitman driven from a crank provided at one end of a driving shaft. A fly wheel is commonly provided on the shaft and this fly wheel may be counter-balanced in an attempt to compensate for the vibration due to the reciprocation of the knife. However such an unbalanced rotary motion does not adequately compensate the unbalanced reciprocatory motion.

It is among the objects of the present invention to provide a drive for a mower knife or analogous reciprocating member which drive shall adequately counteract the vibration due to the reciprocation of the knife.

A further difficulty arising in connection with mowing machines as at present constructed resides in the fact that the pitman box requires frequent oiling. This means that the machine must be stopped and time lost to provide for such lubrication which if neglected results in the wearing or burning out of the pitman box, broken pitman sticks and other difficulties.

It is among the objects of the present invention to provide a drive for a mowing machine knife which drive is completely enclosed in an adequate housing so that the moving parts may be completely immersed in lubricating oil.

It is a further object to provide such an enclosed housing for the drive mechanism which housing may rotate about the axis of the driving shaft as the knife blade is lifted into an upright or non-cutting position.

It is a further object of invention to provide a drive mechanism of the type described which is entirely sealed against the entrance of dust or abrasives.

It is a further object of the invention to provide an improved driving mechanism for the knife of a mowing machine which mechanism will eliminate the necessity for the troublesome knife head of conventional machines and which accordingly will eliminate the necessity for the knife head wear plates.

The above and other objects and features of the invention will be obvious to those skilled in the art from a consideration of the following detailed description taken in conjunction with the accompanying drawing in which:

Figure 1 represents a horizontal section, with parts shown in elevation, through a drive mechanism constructed in accordance with the invention and also showing its mode of attachment to the mowing machine and its mode of attachment to the knife of the mower.

Figure 2 represents a vertical section through the driving mechanism taken upon the line 2—2 of Figure 1.

Figure 3 represents a section taken upon line 3—3 of Figure 2.

Referring to the drawing reference numeral 10 indicates a fluid tight housing of a generally square or rectangular cross section. The housing 10 is supported by brackets 11, which are attached to the mowing machine in any suitable manner, the housing 10 being provided with a raised portion or boss 12 projecting from one face thereof and an annular boss 13 projecting from the opposite face, which bosses provide pivots for the houseing 10 in the brackets 11. A power shaft 14 which is driven from the mower in any suitable manner extends into the housing 10 through the boss 13 making an oil tight joint therewith and passing through the housing is journaled at its opposite end in the boss 12. Within the housing 10, the power shaft 14 carries a pair of steel cams or eccentrics 15 and 16, which eccentrics are rigidly fixed to the shaft and so mounted that the eccentricity of one is opposite to that of the other. The steel cams or eccentrics 15 and 16 are provided with bronze driving blocks 17 and 18 which driving blocks provide a circular inner surface conforming to the circumferential surface of the eccentrics and plane external edge surfaces conforming to the inner surfaces of rectangular yokes 19 and 20. The yokes 19 and 20 have exterior surfaces corresponding in general to the interior surfaces of the wall of the housing 10 except that they are of less width than the internal width of these walls although of the same depth as the internal depth of the housing. As shown the eccentrics 15 and 16 and the bronze driving blocks 17 and 18 are identical in size and shape. The yokes 19 and 20 however are not identical in size and weight since the yoke 19 consists entirely of a rectangular frame while the yoke 20 includes a rectangular frame portion 21 which of itself is identical with the frame of yoke 19, but the yoke 20 also includes a heavy metallic block portion 22. A guide rod 23 is attached to the yoke 19 and projects into a cylindrical extension 24 formed on the side wall of the housing 10 to provide a rigid guiding surface for the rod 23. On its opposite edge, and near a lower portion thereof, the yoke 19 is attached to a rod 25 which rod projects through an annular boss 26 formed on the lower side wall of the housing 10. Rod 25 is directly connected to the blade or knife 27 of the mower.

The yoke 20 is provided with guide rods 28 and 29 which project from the side walls thereof into cylindrical extensions 30 and 31 formed on the side walls of the housing 10 and which cylindrical extensions provide guide surfaces for the guide rods in the same manner as was previously noted in connection with guide rod 23 and cylindrical extension 24.

In operation rotation of the shaft 14 rotates the eccentric 15 and this rotation of the eccentric moves the bronze driving block 17 up and down in the rectangular frame of the yoke 19 while simultaneously moving the yoke 19 to and fro in the housing 10. This reciprocatory motion of the yoke 19 is directly transmitted to the knife rod 25 and thence to the knife of the mower. Simultaneously with this motion of the yoke 19 and the attached knife the eccentric 16 moves the driving block 18 in the opposite direction causing the block 18 to move up and down within the frame 21 of the yoke 20 and thereby causing the yoke 20 to move to and fro in housing 10 in a direction opposite to that of the motion of the yoke 19. The yoke 20 being heavier than the yoke 19 due to the heavy block portion 22 of the yoke 20 and the motion of this block 22 being in the opposite direction to the motion of the knife rod 25 may exactly compensate or counter balance the vibrations which would result from unbalanced reciprocating motion of the rod and the attached knife.

The housing 10 may be supplied with lubricating oil through an opening 32 which opening is normally closed by a plug 33 so that sufficient oil may be contained in the housing to submerge or partially submerge the moving parts of the mechanism.

It will be seen that when the blade is elevated the entire housing 10 may swing in the brackets 11 so that connection between the knife rod 25 and the knife 27 may be rigid.

It will also be apparent that since the raised portion or boss 12 and the annular boss 13 are in alignment and have circumferential surfaces concentric with the surface of the drive shaft 14, the casing may be rotated upon these two bosses which thereby serve as trunnions without affecting the connections with the drive shaft 14.

As disclosed packing glands are not provided to seal the clearance space between the drive shaft and the interior surface of the annular boss 13 nor between the reciprocating rod 25 and the interior surface of the annular boss 26. These being the only two points at which lubricating oil may leak from the housing the clearance between the rods and the interior walls of the boss may be such that oil of the usual viscosity of lubricating oil will not flow through this clearance or if desired a conventional packing gland may be used and in the following claims such expedients are intended to be included in the words "oil tight fit."

While there has been herein described but a single embodiment of the invention other modifications and embodiments within the scope of the appended claims will be apparent to those skilled in the art.

Having thus described the invention I claim:

1. A drive for the knife of a mowing machine including in combination a driving shaft, a pair of cams mounted adjacently upon said shaft with the throw of one diametrically opposite to that of the other, a pair of yokes each of which is actuated by one of said cams, one of said yokes being directly connected to said knife to reciprocate the same and the other said yoke having sufficient mass rigid therewith to compensate for vibrations due to the reciprocating motion of said knife blade in either direction.

2. A drive for the knife of a mowing machine including in combination a drive shaft, a pair of oppositely disposed eccentrics mounted adjacently on said shaft, a driving block mounted on each of said eccentrics and a yoke driven from each of said driving blocks, one of said yokes being directly connected to said blade and the other of said yokes having sufficient mass incorporated therewith to compensate for vibrations due to the reciprocation of said blade in either direction.

3. A device of the class described comprising a housing, said housing having an opening in a side wall thereof, an annular boss surrounding said opening and projecting outwardly of said housing, a drive shaft extending through said opening and into said housing, a pair of oppositely disposed cams mounted upon said shaft within said housing, a pair of yokes each of which is actuated by one of said cams, a rod connected to one of said yokes and projecting through an opening in an end wall of said housing, a member attached to said rod for reciprocation thereby, the other of said yokes having sufficient mass to compensate for vibrations due to the reciprocation of said member in either direction.

JOHN S. CURTIS.